(12) United States Patent
Schwarzmann

(10) Patent No.: US 8,467,958 B2
(45) Date of Patent: *Jun. 18, 2013

(54) SYSTEM AND METHOD FOR TRIP ROUTING WITH CONFIGURABLE CONSTRAINTS

(75) Inventor: Winfried Schwarzmann, Waghaeusel (DE)

(73) Assignee: SAP AG, Walldorf (DE)

( * ) Notice: Subject to any disclaimer, the term of this patent is extended or adjusted under 35 U.S.C. 154(b) by 569 days.

This patent is subject to a terminal disclaimer.

(21) Appl. No.: 12/709,818

(22) Filed: Feb. 22, 2010

(65) Prior Publication Data

US 2010/0152998 A1   Jun. 17, 2010

Related U.S. Application Data

(63) Continuation of application No. 11/481,880, filed on Jul. 5, 2006, now Pat. No. 7,774,133.

(51) Int. Cl.
*G01C 21/00* (2006.01)

(52) U.S. Cl.
USPC .......................................... 701/410; 342/451

(58) Field of Classification Search
USPC .. 701/400, 408–413, 426, 445; 342/451–452; 340/995
See application file for complete search history.

(56) References Cited

U.S. PATENT DOCUMENTS

| | | | |
|---|---|---|---|
| 4,685,398 A | 8/1987 | Kissel | |
| 5,063,857 A | 11/1991 | Kissel | |
| 6,085,147 A | 7/2000 | Myers | |
| 6,169,956 B1 | 1/2001 | Morimoto et al. | |
| 6,308,177 B1 * | 10/2001 | Israni et al. | 701/461 |
| 6,810,328 B2 * | 10/2004 | Yokota et al. | 701/414 |
| 7,197,500 B1 * | 3/2007 | Israni et al. | 707/809 |
| 2004/0102898 A1 | 5/2004 | Yokota et al. | |
| 2006/0015249 A1 | 1/2006 | Gieseke | |

OTHER PUBLICATIONS

Non-final Office Action dated Jun. 29, 2009, U.S. Appl. No. 11/481,880, filed Jul. 5, 2006, 11 pgs.
Non-Final Office Action dated Dec. 28, 2009, U.S. Appl. No. 11/481,880, filed Jul. 5, 2006, 8 pgs.

* cited by examiner

*Primary Examiner* — Dalena Tran
(74) *Attorney, Agent, or Firm* — Blakely Sokoloff Taylor & Zafman LLP

(57) ABSTRACT

A method of analyzing a path by defining a plurality of contiguous geographical regions, each to have a uniform value of a characteristic affecting travel through the region and evaluating the path from a point in an origin region through an intermediate region to a point in a destination region. Related methods and means of representing paths, and systems to implement the methods are also described and claimed.

10 Claims, 6 Drawing Sheets

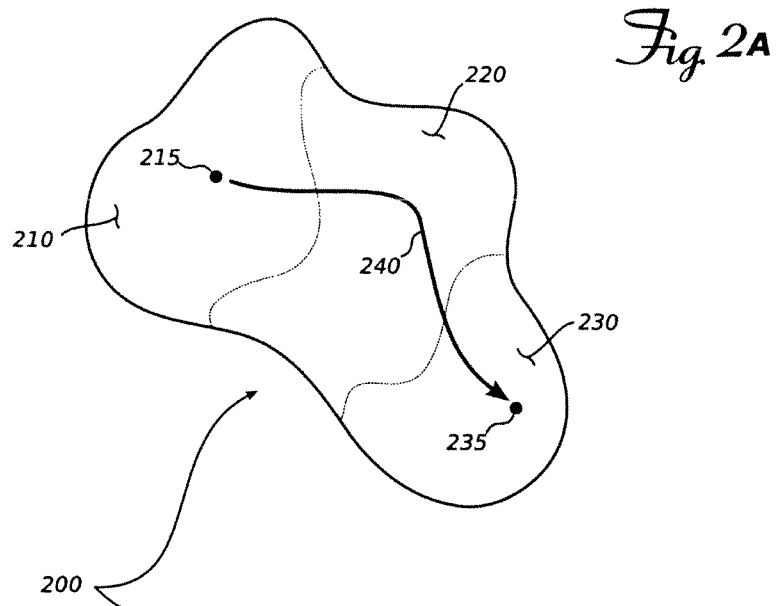
*Fig.* 2A
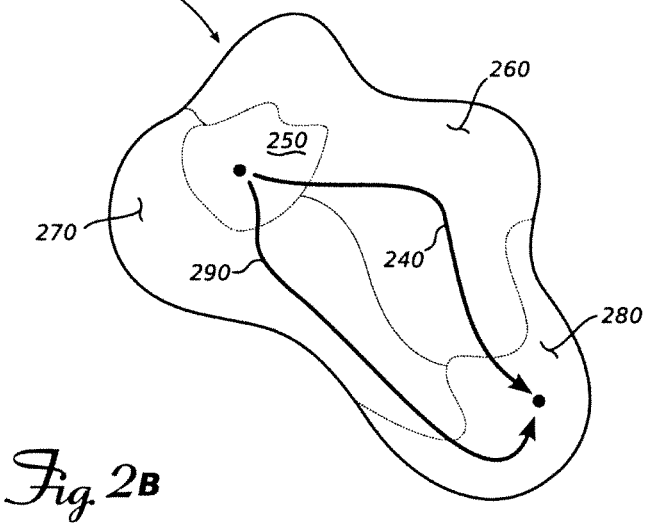
*Fig.* 2B

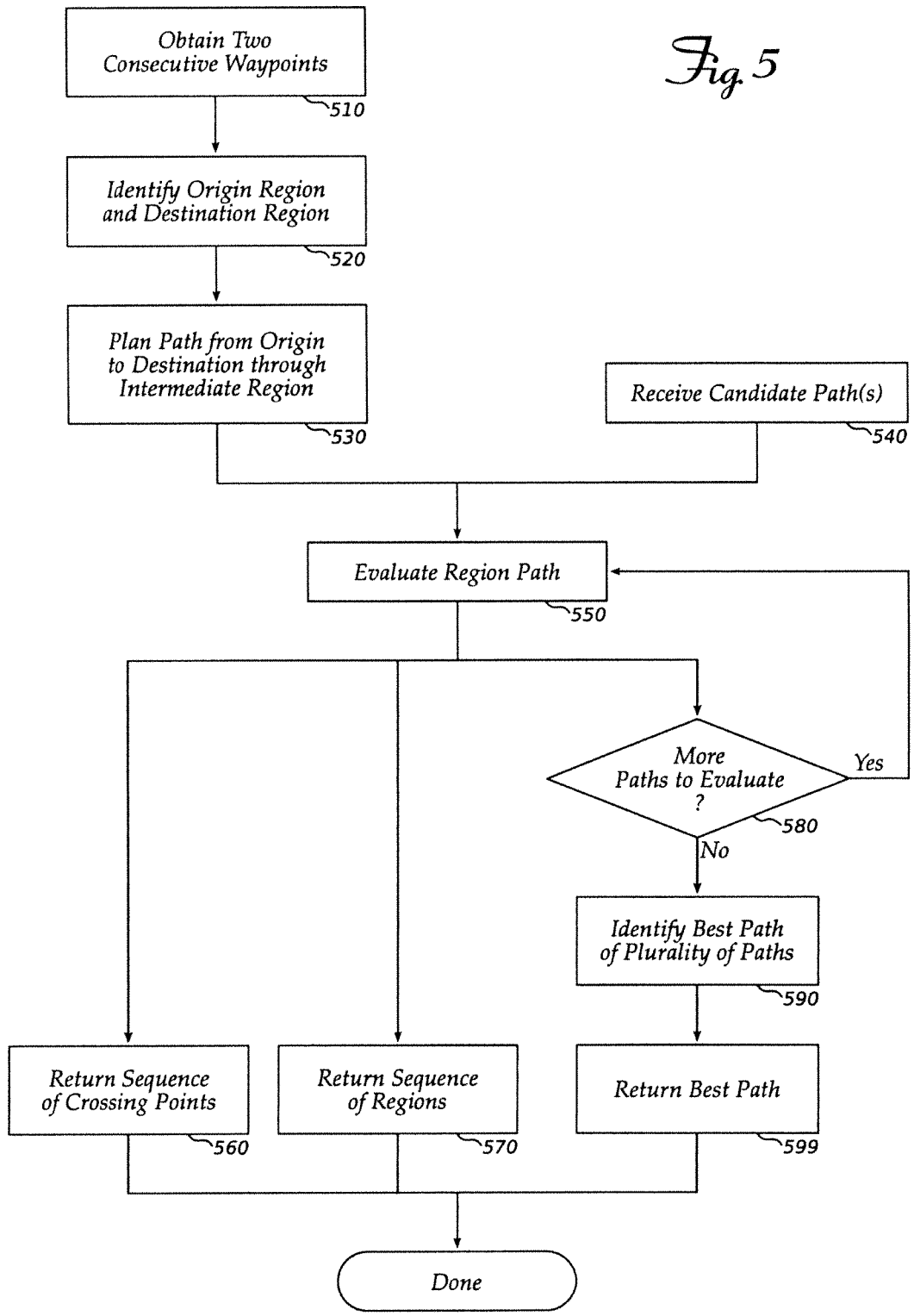

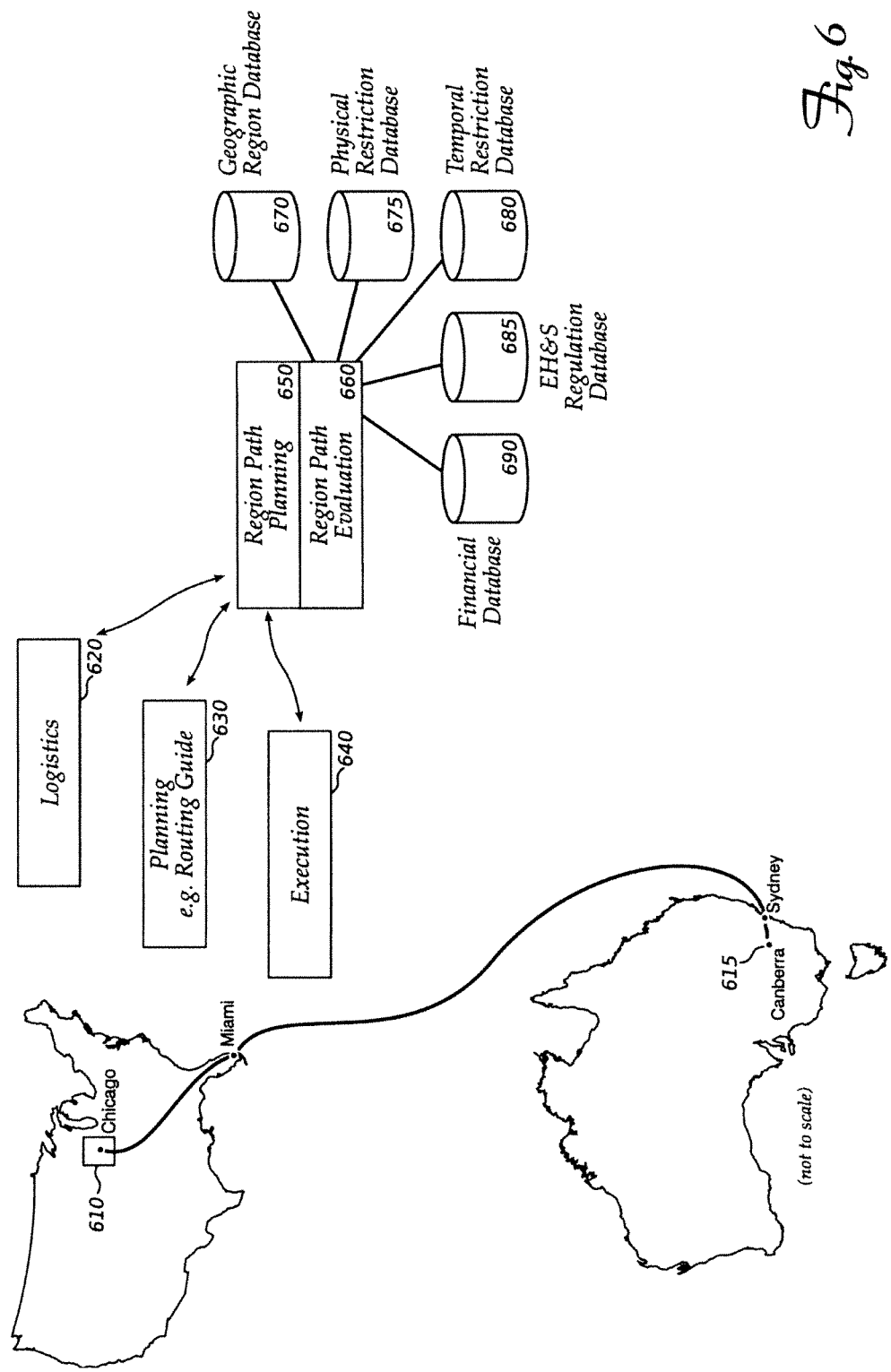

SYSTEM AND METHOD FOR TRIP ROUTING WITH CONFIGURABLE CONSTRAINTS

This application is a continuation of pending U.S. patent application Ser. No. 11/481,880, filed Jul. 5, 2006, entitled SYSTEM AND METHOD FOR TRIP ROUTING WITH CONFIGURABLE CONSTRAINTS.

FIELD

Embodiments of the invention relate to trip routing incorporating configurable constraints in the selection and evaluation of routes. More specifically, embodiments permit the planning of trips taking into account the legal restrictions in every region through which the trip might pass.

BACKGROUND

Trip routing problems present the question how to travel from a first location to a second location efficiently. Often, additional constraints may be present. For example, the trip must be completed within a certain period of time, or must pass through certain intermediate waypoints. The general form of many trip routing problems is called "NP Complete," signifying that the problem is of a class that cannot be solved in polynomial time by any known algorithm, and furthermore that the problem is equivalent to other problems in the class, so that an algorithm to solve one problem could be applied to solve the others as well.

Although there is currently no known solution to the general trip routing problem, heuristics have been identified that often lead to an acceptable (if not provably optimal) solution within a reasonable amount of time. Because routing problems appear in many business situations, new heuristics to help find, refine and evaluate practical solutions can be of great value.

One factor that affects practical trip routing is legal restrictions imposed by countries, cities, or other political subdivisions upon vehicles carrying cargo through their jurisdiction. Another factor is physical restrictions such as height, width and weight limitations. Current routing heuristics often cannot model such restrictions correctly, and may not be able to evaluate trips dynamically. A heuristic that can deal with legal, physical, and similar restrictions, and do so for trips between arbitrary locations and at arbitrary times, may be useful.

SUMMARY

Embodiments of the invention model a neighborhood of regions as a directed graph whose nodes represent regions and whose edges encode restrictions on travel between adjacent regions. Routes are evaluated by analyzing a walk through the graph.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 2A and 2B show how a simplified geographical area can be partitioned into regions in different ways.

FIG. 5 outlines a method according to an embodiment of the invention.

FIG. 6 shows how an embodiment of the invention can fit into a larger system.

DETAILED DESCRIPTION

Embodiments of the invention evaluate potential routes from an origin to a destination by identifying regions through which a route passes. A region is a contiguous geographical area that has a uniform value of a constraint that affects travel along the route. Regions need not be coextensive with political boundaries such as cities, states or countries; nor are they restricted to physical features of the landscape such as rivers and mountains. Evaluation of routes can occur in the larger context of finding a route: several potential routes may be identified and evaluated, and the best route selected on the basis of its score on one or more evaluations.

Embodiments of the invention can operate independently, or can be embedded into an arbitrary trip planning system that takes other factors into account. In an embedded scenario, an embodiment of the invention may provide one score (or a small number of scores) for a proposed trip that the larger system can use to adjust its operation to find a better solution.

Figure 1:
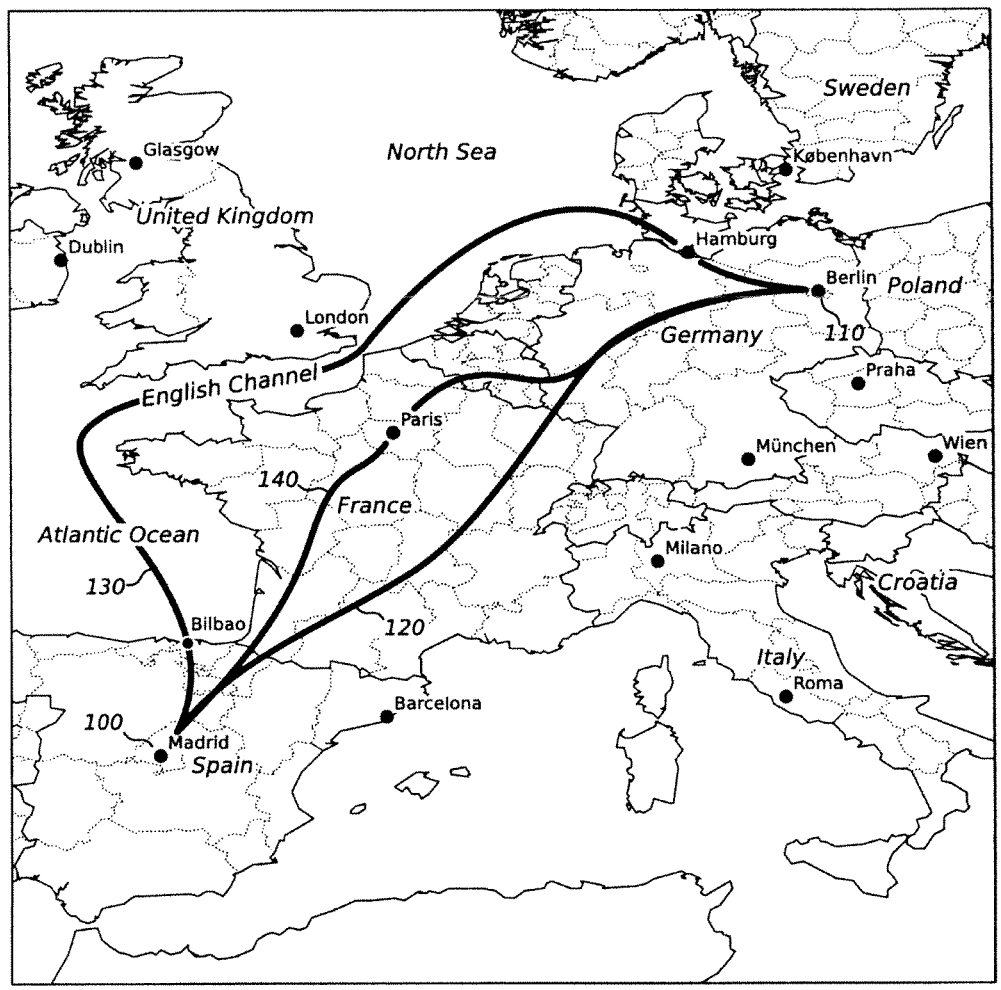
FIG. 1 shows a real-world trip routing problem that may be addressed by an embodiment of the invention.

FIG. 1 shows a practical example of a trip routing problem that can be addressed with an embodiment of the invention. A shipper wishes to move a cargo from Madrid, Spain (100) to Berlin, Germany (110). The cargo may be transported entirely over land (route 120) or by land and sea (route 130). Additional considerations may require that the route passes through specific points along the way (e.g. route 140 passes through Paris, France). Each potential land route passes through at least three countries (Spain, France and Germany), and some routes pass through Belgium or Switzerland as well. Other routes, passing through other countries, may also be considered. Furthermore, within a country, a route may pass through one or more cantons, prefectures, counties, or other similar politically-determined subdivisions. Similarly, sea routes may pass through waters subject to different restrictions (for example, route 130 sails on the Atlantic Ocean, the English Channel and finally the North Sea).

Each country, subdivision or area may affect travel over a route in a way that is of interest to the shipper. For example, a country may impose legal restrictions that prohibit passage of certain materials, or may charge a tax or fee for the use of roads and facilities. Other conditions that affect travel over a route may be related to physical features. For example, a route may pass through a mountainous region with narrow roads or tunnels that limit the physical size of cargo that may pass. This sort of restriction may not be related to a particular country or subdivision. Regular, but non-constant, restrictions may be imposed by still other conditions. For example, a road segment used by a route may be known to be crowded at certain times of the day. These various sorts of restrictions or conditions affecting travel over a route can be modeled and their effect evaluated according to an embodiment of the invention.

In subsequent figures and discussion, simpler maps and routes will be used to illustrate aspects of embodiments of the invention more clearly. Extension of the concepts presented here to real-world geography is straightforward.

FIG. 2A shows an area 200 divided into several regions 210, 220 and 230. Each region is defined as a geographical area that has a uniform value of a characteristic affecting travel through the region. For example, region 210 may enforce an Environment, Health and Safety ("EH&S") restriction prohibiting carriage of more than ten tons of a particular material; region 220 may limit carriage of the same material to the hours between 06:00 and 22:00; and region 230 may impose no limitation on transport of the material. The various restrictions are consistent throughout each corresponding region (conversely, if a region had (in two different sub-regions) different policies regarding the transport of the material, it would by definition be two different regions).

A path 240 from a point 215 in origin region 210, passing through intermediate region 220, and continuing to a point 235 in destination region 230 is to be evaluated, yielding a score that describes an aspect of shipping a cargo of the material over the route. The score may indicate whether such a shipment is possible (in this example, a shipment exceeding ten tons, or passing through region 220 between 22:00 and 06:00, would not be permitted). Alternatively, the score may indicate a monetary cost of the shipment (e.g. if the characteristic that defines the regions is related to taxes or fees charged for travel in the region); a time required (e.g. if the regions are defined by road congestion predictions); or an untyped numerical value representing an abstract favorability or "goodness" of the path, for comparison with a similar goodness of an alternative path.

FIG. 2B shows the same area 200, divided into different regions 250, 260, 270 and 280. These regions are defined according to a different characteristic affecting travel through the regions. Note that with this region arrangement, a second path 290 is possible that passes through regions 250, 270 and 280 (path 240, when considered with respect to this second region partitioning, passes through regions 250, 260 and 280). Embodiments of the invention can evaluate paths 240 and 290 and select a preferred one of the two paths based on the evaluation with respect to the characteristic.

Figure 3:
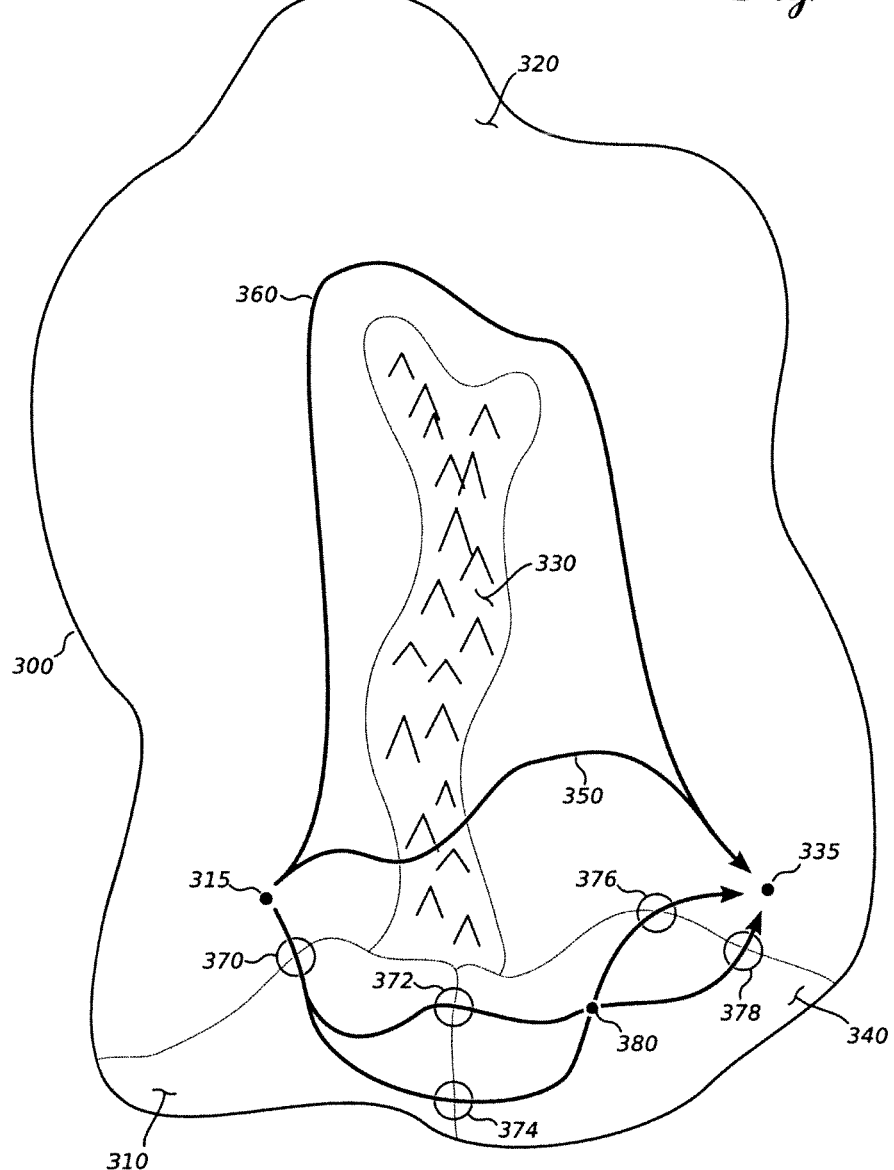
FIG. 3 shows additional features of region representations.

FIG. 3 shows another hypothetical geographic area 300, which is divided into a number of regions 310, 320, 330 and 340. Several possible paths from origin 315 to destination 335 are indicated (note that both origin and destination are in the same region 320). The shortest of the paths, 350, traverses intermediate region 330. As indicated in the Figure, region 330 is mountainous, and therefore it may be expensive or impossible to carry certain cargo along route 350. An evaluation of path 350 according to an embodiment of the invention may be compared with a second evaluation of longer path 360 to determine which is more favorable.

The lower portion of FIG. 3 shows some additional potential paths that traverse regions 310 and 340. These paths highlight another aspect of embodiments of the invention. In the real world, shipments will not be carried aimlessly about a region, but will instead be transported over a fixed route such as a road or a railway. Consequently, it may not be necessary to identify the precise contours of a region's borders. Instead, paths may be analyzed in terms of a series of crossing points from one region to another. Several such crossing points are indicated in FIG. 3 at 370, 372, 374, 376 and 378. One or more crossing points may be identified between two adjacent regions, and paths expressed as a sequence of crossing points. Multiple crossing points between the same two regions (e.g. 372 and 374 or 376 and 378) may be interchangeable with respect to the travel-affecting characteristic that defines those regions, but one or the other may be preferred when the path is evaluated by, for example, total distance. Also, crossing points may not be found precisely at the intersection of a path and the border between two regions because other locations nearby are better known. Crossing points will typically identify locations along a road or railway such as an inspection station, refueling depot, or transshipment terminal.

A transshipment terminal is a place where cargo may be forwarded to another transportation modality. For example, a shipment may arrive by truck or ship, and be carried further by rail or air. In FIG. 3, element 380 indicates a transshipment point. It lies entirely within region 340, so it is not a crossing point with respect to any of the regions shown in the Figure, but it may be at a crossing point when a path is evaluated against a different set of regions.

Points on a path (whether crossing points between regions, transshipment points, or simply locations known to be along the path) may be thought of generically as waypoints. Furthermore, a path can be broken down into shorter segments and analyzed piecewise. This may simplify calculations. When broken down, the origin waypoint of an $n^{th}$ segment is the destination waypoint of the $(n-1)^{th}$ segment, and the destination waypoint of the $n^{th}$ segment is the origin waypoint of the $(n+1)^{th}$ segment.

Note that region definitions may be dependent upon a mode of transportation (i.e. the regions affecting travel by truck between two points may be significantly or completely different from the regions affecting travel by rail between the same two points). Region/path evaluation according to an embodiment may be most effective when path segments without transshipment points are considered. In other words, an existing system may select transportation modalities and perform "coarse" routing by identifying transshipment points, and an embodiment of the invention can plan and/or evaluate single-modality routes between transshipment points.

Figure 4A:
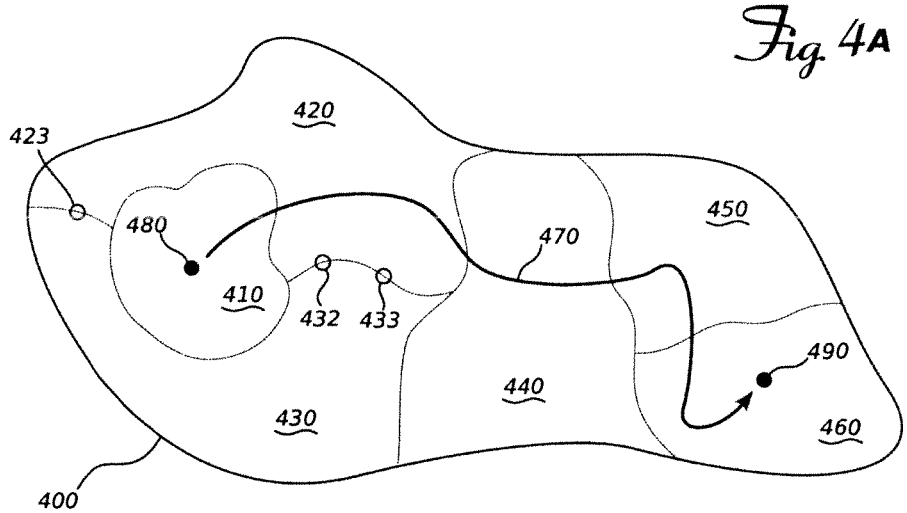
FIGS. 4A and 4B show how the "universe" of all regions (for a single Mode of Transportation) can be represented as a graph, and how each path through some of these regions corresponds to a path in the graph.
Figure 4B:
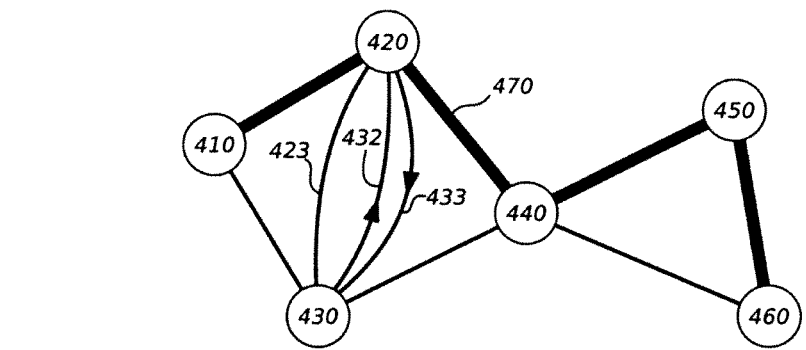

FIG. 4A shows another geographical area 400, divided into regions 410, 420, 430, 440, 450 and 460. A path 470 is shown from origin 480 to destination 490. This group of regions can be represented as a graph, as shown in FIG. 4B. Each node represents one of the regions, and edges between nodes represent contiguity between the regions represented by the nodes. Multiple crossing points between two regions (FIG. 4A, 423, 432 and 433) may be represented as multiple edges (FIG. 4B, 423, 432 and 433) between two nodes (420 and 430). Sometimes a crossing point can only be used in the selection and evaluation of paths in one direction. The arrows on edges 432 and 433 in FIG. 4B indicate this situation. In the physical world, this may correspond to an actual one-way street, or to a direction-dependent difference in passing through the crossing point (for example, a bridge that requires a toll in only one direction).

Path 470 may be represented in the graph of FIG. 4B by the thick edges connecting nodes 410, 420, 440, 450 and 460— the same regions through which the path passes in the geographical representation. Edges may encode information about travel from region to region, so a path may be evaluated by analyzing a corresponding walk through the graph.

FIG. 5 is a flow chart of operations to plan a path from a first waypoint to a second waypoint according to an embodiment of the invention. First, two consecutive waypoints ("from" and "to") are obtained (510). In some systems, an exact location of a waypoint may be unavailable. Instead, a waypoint may only identify an area or zone where the path segment begins or ends. As a concrete example, a waypoint may be given as a ZIP code used by the United States Postal Service to identify localities.

Next, an origin and a destination region, containing the "from" and "to" waypoints (or zones), are identified (520).

Regions are defined as previously described: contiguous sets of points that share a common characteristic affecting travel through the region.

Then, a path is planned between the waypoints and passing through at least one intermediate region (530). This path may be represented as a sequence of regions, a sequence of crossing points, or other similar form. Alternatively, instead of obtaining waypoints and planning a path, an embodiment may simply receive one or more candidate paths that were planned by another system (540).

The path is evaluated to produce a path score (550). The score may correspond to a cost to travel through each of the regions in the sequence or to pass from region to region at intermediate crossing points. It may correspond to an estimated time required to travel through the regions, or an estimated distance (length) of the path. If information about the cargo to be transported along the path (i.e. a "cargo class") is available, the score may indicate whether transport of the cargo is in conformity with legal restrictions such as Environmental, Health and Safety Regulations, that affect carriage of the cargo through the regions involved.

Finally, the embodiment produces a result. One result may be a sequence of crossing points between regions (560). Another may be a sequence of regions (570). If an embodiment received a plurality of candidate paths, it may determine whether there are any more paths to evaluate (580), and return an identity of the "best" path according to the evaluation (590). Other information about the path may also be returned. For example, information about the most restrictive value of the characteristic affecting travel through the regions may be of interest to a user of an embodiment. An embodiment could answer the question, "what is the longest/widest/tallest/heaviest load that may be carried from the first waypoint to the second waypoint?"

FIG. 6 shows how an embodiment of the invention may be positioned within a larger system. An objective of such a system may be to plan, schedule and carry out transportation of goods from place to place. In particular, it may be desired to plan and execute the transportation of a specific cargo from Chicago, Ill. 610 to Canberra, Australia 615. An embodiment of the invention can provide region path planning and evaluation services to logistics 620, scheduling 630, and execution 640 modules. Embodiments may include both path planning 650 and path evaluation 660 components. Path evaluation 660 may also operate on paths provided directly from some other system. For example, a legacy system may use predetermined shipment routing data to plan transportation operations. An embodiment of the invention can use the region analysis described here to evaluate such a predetermined path, taking into consideration the actual cargo to be transported and an estimated schedule, to ensure that the shipment will be in conformity with all laws and restrictions to which it may be subjected on its journey.

Embodiments of the invention may refer to a database 670 containing geographical information such as the location of waypoints, crossing points, transshipment points and region boundaries. Physical restriction database 675 may describe size, weight, and other similar constraints on items carried by a transport facility. Temporal restriction database 680 may contain information about traffic congestion, inspection and border crossing delays, and other data to permit a transport schedule to be estimated. Environment, Health and Safety ("EH&S") regulation database 685 may contain information about laws and regulations affecting the transport of certain types or classes of cargo (e.g. hazardous, radioactive, or flammable material; raw agricultural products) via available modes of transportation (e.g. train, truck, ship, air). For example, in the shipment from Chicago to Canberra, EH&S database 685 may contain information about truck and train regulations between Chicago and Miami; shipping regulations affecting Atlantic and Pacific waters; and truck regulations (among others) for Australia. Financial database 690 may permit an embodiment to estimate monetary costs of moving a particular type of cargo over a path. Other databases may contain information about other factors affecting travel or carriage of cargo along a path. These factors may serve to distinguish regions based on other criteria.

The separation of information about regions from information about paths through those regions provides a useful data abstraction. For example, if a new travel constraint such as an EH&S regulation affecting a region is implemented, the corresponding database can be updated and all paths through the region can be evaluated automatically in light of the new constraint. Other data decompositions that lack the "region" concept may require each path to be updated and checked when a new regulation is imposed. This may result in an increased maintenance burden as compared to a system using an embodiment of the invention.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that efficient trip plans can also be produced by software and hardware that distribute the functions of embodiments of this invention differently than herein described. Such variations and implementations are understood to be captured according to the following claims.

I claim:

1. A method comprising:
defining a plurality of contiguous geographical regions, each region to have a uniform value of a characteristic throughout the region; and
evaluating, by a computer, a path from a point in an origin region to a point in a destination region and passing through an intermediate region based on a first value of the characteristic in the origin region, a second value of the characteristic in the intermediate region, and a third value of the characteristic in the destination region.

2. The method of claim 1, further comprising:
identifying an alternative path; and
selecting at least one of the path or the alternative path based on an evaluation.

3. The method of claim 1 wherein evaluating the path comprises:
identifying a plurality of alternative crossing points at which the path may cross from one region to another region; and
selecting one of the alternative crossing points.

4. The method of claim 1 wherein the point in the origin region and the point in the destination region mark a first segment of a multi-segment trip, the method further comprising:

repeating the evaluating operation on a path from the point in the destination region of the first segment to an endpoint of a second segment of the multi-segment trip.

5. The method of claim 1 further comprising:

identifying cargo to be shipped by the path and wherein the path is evaluated based on characteristics influencing one of the cost, the time or the viability of shipping the cargo by the path.

6. The method of claim 5 wherein evaluating further comprises:

accessing a temporal restriction database, a physical restrictions database, and a health and safety regulations database.

7. A method comprising:

obtaining two consecutive waypoints of a trip;

identifying an origin region containing a first of the two waypoints and a destination region containing a second of the two waypoints, wherein a region is a contiguous set of points that share a common characteristic;

planning, by a computer, a path for the shipment of cargo from the first waypoint to the second waypoint through at least one intermediate region based on an evaluation based on the common characteristic wherein the characteristic effects the time, cost or viability of shipping the cargo; and returning the path to a logistics module for further processing of the shipment.

8. The method of claim 7 wherein returning the path comprises returning a sequence of regions starting with the origin region, continuing through at least one intermediate region, and ending with the destination region.

9. The method of claim 7 wherein returning the path comprises returning a sequence of crossing points, each crossing point to identify a point near an intersection of the path and a common border between two consecutive regions.

10. The method of claim 7 wherein at least one of the first waypoint and the second waypoint is identified as a zone within a region.

* * * * *